United States Patent
Jones et al.

(10) Patent No.: US 8,811,988 B2
(45) Date of Patent: *Aug. 19, 2014

(54) DYNAMICALLY CREATING A GLOBALLY UNIQUE IDENTIFIED OF A SUBSCRIBER DEVICE BASED ON AN IDENTIFIED OF AN AGGREGATION DEVICE AND IDENTIFICATION INFORMATION OF THE SUBSCRIBER DEVICE FOR CIRCUIT-SWITCHED AND PACKET-SWITCHED COMMUNICATION SYSTEMS

(75) Inventors: Anthony Robert Jones, Kanata (CA);
Elaine E E Lay Quah, Ingleburn (AU);
Douglas Jon Nielsen, Nepean (CA);
Lejla Eminovic, Nepean (CA)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/485,290

(22) Filed: May 31, 2012

(65) Prior Publication Data

US 2012/0236794 A1 Sep. 20, 2012

Related U.S. Application Data

(63) Continuation of application No. 12/346,983, filed on Dec. 31, 2008, now Pat. No. 8,213,935.

(51) Int. Cl.
*H04W 4/00* (2009.01)
*H04L 29/12* (2006.01)
*H04W 8/26* (2009.01)
*H04W 8/04* (2009.01)
*H04W 84/04* (2009.01)

(52) U.S. Cl.
CPC . *H04W 8/26* (2013.01); *H04W 8/04* (2013.01); *H04L 61/3015* (2013.01); *H04L 29/12622* (2013.01); *H04L 61/309* (2013.01); *H04L 29/12669* (2013.01); *H04L 61/304* (2013.01); *H04W 84/045* (2013.01); *H04L 29/12764* (2013.01)
USPC ........ 455/435.1; 455/411; 455/420; 455/436; 455/437; 370/328; 370/352; 370/389

(58) Field of Classification Search
CPC ................... H04L 29/12622; H04L 29/12764; H04L 61/3015; H04L 61/309; H04W 8/04; H04W 8/26
USPC ........... 455/435.1, 410, 466, 406, 414.1, 426, 455/415, 411, 420, 422.1, 436, 437, 438, 455/442, 450–452.1, 525, 552.1, 426.1; 370/352, 338, 328, 389, 465, 521

See application file for complete search history.

(56) References Cited

U.S. PATENT DOCUMENTS

| | | | |
|---|---|---|---|
| 5,930,701 | A | 7/1999 | Skog |
| 5,956,633 | A | 9/1999 | Janhila |
| 6,996,087 | B2 | 2/2006 | Ejzak |
| 7,319,861 | B2 | 1/2008 | Benco et al. |
| 7,477,632 | B1 | 1/2009 | Radhakrishnan et al. |
| 2002/0055971 | A1 | 5/2002 | Shahrier |
| 2003/0013467 | A1 | 1/2003 | Caloud |
| 2004/0078316 | A1 | 4/2004 | Clark et al. |
| 2004/0205192 | A1 | 10/2004 | Olson et al. |
| 2004/0268148 | A1 | 12/2004 | Karjala et al. |
| 2005/0111494 | A1 | 5/2005 | Kecskemeti |
| 2006/0018272 | A1 * | 1/2006 | Mutikainen et al. .......... 370/328 |
| 2006/0116105 | A1 | 6/2006 | Frankel et al. |
| 2006/0126594 | A1 | 6/2006 | Tu |
| 2007/0002831 | A1 * | 1/2007 | Allen et al. .................... 370/352 |
| 2007/0238468 | A1 | 10/2007 | Buckley et al. |
| 2007/0274306 | A1 | 11/2007 | Kouchri et al. |
| 2008/0102801 | A1 | 5/2008 | Lazaridis et al. |
| 2008/0244148 | A1 | 10/2008 | Nix, Jr. et al. |
| 2010/0067443 | A1 | 3/2010 | Luo et al. |

FOREIGN PATENT DOCUMENTS

| | | |
|---|---|---|
| JP | H11341562 | 12/1992 |
| WO | 2006/136028 | 12/2006 |
| WO | 2008/073554 | 6/2008 |

OTHER PUBLICATIONS

"Supporting Globally Routable User Agent URI in IMS; Report and Conclusions (Release 7)," 3GPP TR 23.808 V1.0.1, vol. 23.808, No.

V1.0.1, May 1, 2006, pp. 1-17, Retrieved from the Internet: http://www.3gpp.org/ftp/Specs/archive/23_Series/23.808-101.zip (retrieved on Nov. 28, 2008).

Office Action from Japanese Patent Application 2011-544088, dated Dec. 9, 2013, English version, pp. 1-4.

Office Action from Russian Patent Application No. 2011120057, mailed Jan. 14, 2014, English and Russian versions, pp. 1-8.

Canadian Patent Office, International Search Report and Written Opinion issued in corresponding PCT Application No. PCT/IB2009/007684, 11 pages, Apr. 13, 2010.

* cited by examiner

*Primary Examiner* — Babar Sarwar

(74) *Attorney, Agent, or Firm* — Meyertons, Hood, Kivlin, Kowert & Goetzel P.C.

(57) ABSTRACT

To register a mobile device located in a first network with a packet-switched services network, a registration request is received from an aggregation device in the first network. The registration request contains an identifier of the aggregation device and identification information of the mobile device, where the identification information is previously unknown to the packet-switched services network. A globally unique identifier of the mobile device is dynamically created based on the identifier of the aggregation device and the identification information of the mobile device, wherein the globally unique identifier is used for uniquely identifying the mobile device in the packet-switched services network.

22 Claims, 4 Drawing Sheets

DYNAMICALLY CREATING A GLOBALLY UNIQUE IDENTIFIED OF A SUBSCRIBER DEVICE BASED ON AN IDENTIFIED OF AN AGGREGATION DEVICE AND IDENTIFICATION INFORMATION OF THE SUBSCRIBER DEVICE FOR CIRCUIT-SWITCHED AND PACKET-SWITCHED COMMUNICATION SYSTEMS

CROSS-REFERENCE TO RELATED APPLICATIONS

This application is a continuation of U.S. patent application Ser. No. 12/346,983, filed Dec. 31, 2008 now U.S. Pat. No. 8,213,935, the content of which is hereby incorporated herein by reference.

TECHNICAL FIELD

The invention relates generally to creating a globally unique identifier of the subscriber device.

BACKGROUND

Many types of communications can be performed over data networks (wireless and/or wireline networks), including electronic mail, web browsing, file downloads, electronic commerce transactions, voice or other forms of real-time, interactive communications, and others. To enable the establishment of communications sessions in a network, various control functions are deployed in the network. Some standards bodies have defined subsystems within communications networks that include such control functions. One such standards body is the Third Generation Partnership Project (3GPP), which has defined an Internet Protocol (IP) multimedia subsystem (IMS) that includes various control functions for provision of IP packet-switched multimedia services, including audio, video, text, chat, or any combination of the foregoing.

Another standards body is the Third Generation Partnership Project 2 (3GPP2), which as defined a multimedia domain (MMD) network to provide packet-switched multimedia services. In the wireline context, the equivalent of an IP multimedia subsystem is sometimes referred to as a Next Generation Networks (NGN).

Services of a packet-switched services network (e.g., IMS network, MMD network, or NGN network) may be accessed by users within an enterprise network. An "enterprise network" refers to a network associated with an enterprise, such as a company, educational organization, or government agency. An "enterprise network" can also refer to a customer network such as a home network or small office network. In one scenario, the packet-switched services network can be considered to be a services "overlay" network that provides services accessible by users of an enterprise network. Typically, the enterprise network has an aggregation device (such as a femtocell base station, a set-top box proxy server that serves multiple set-top boxes, etc.) through which enterprise network users can access the external packet-switched services network. However, an enterprise network user may not have an explicit identity provisioned in the packet-switched services network. Although the aggregation device has an identity provisioned in the packet-switched services network, using the identity of the aggregation device alone does not provide the packet-switched services network enough context to perform communications, such as to route a terminating call request to a specific subscriber device.

SUMMARY

In general, a method of registering a subscriber device located in a first network with a services network includes receiving, from an aggregation device in the first network, a registration request containing an identifier of the aggregation device and identification information of the subscriber device. A globally unique identifier of the subscriber device is created based on the identifier of the aggregation device and the identification information of the subscriber device, where the globally unique identifier is used for uniquely identifying the subscriber device in the services network.

Other or alternative features will become apparent from the following description, from the drawings, and from the claims.

DETAILED DESCRIPTION

In the following description, numerous details are set forth to provide an understanding of some embodiments. However, it will be understood by those skilled in the art that some embodiments may be practiced without these details and that numerous variations or modifications from the described embodiments may be possible.

In general, according to some embodiments, a technique or mechanism is provided for generating a globally unique identifier of a mobile subscriber device in an enterprise network, where the globally unique identifier enables the subscriber device to access services of an external packet-switched services network. A "subscriber device" refers to a device that is associated with a user. Examples of mobile subscriber devices include computers, personal digital assistants, mobile telephones, and so forth. An "enterprise network" refers to a network that is associated with an enterprise, such as a company, organization, or government agency. Alternatively, an enterprise network can also refer to a home, a small business environment, or other environment having a limited geographic area or a limited number of users.

The enterprise network has an aggregation device through which subscriber devices within the enterprise network can access the external packet-switched services network. An "aggregation device" refers to any device that is provided at the edge of an enterprise network, where multiple subscriber devices can connect to the aggregation device for the purpose of accessing services outside the enterprise network. One example of an aggregation device is a femtocell base station, which is a wireless access point that is designed for use in residential or small business environments. Another example of an aggregation device is a set-top box proxy server that serves multiple set-top boxes. Alternatively, the aggregation device can be some other type of wireless or wired access point that can be used in a larger environment provided by the enterprise network.

In accordance with some embodiments, a subscriber device within the enterprise network is able to register into the external packet-switched services network using the identity of the aggregation device. As part of the registration, the packet-switched services network is able to generate a globally unique identifier to identify the subscriber device in the packet-switched services network. The globally unique identifier is a dynamically created unique identifier that is based on the identity of the aggregation device, as well as identification information of the subscriber device provided in a registration message in the registration procedure. Using this technique, the subscriber device does not have to be explicitly provisioned in the packet-switched services network, which may be inefficient since there can be a large number of subscriber devices in various enterprise networks that have access to the packet-switched services network.

Figure 1:
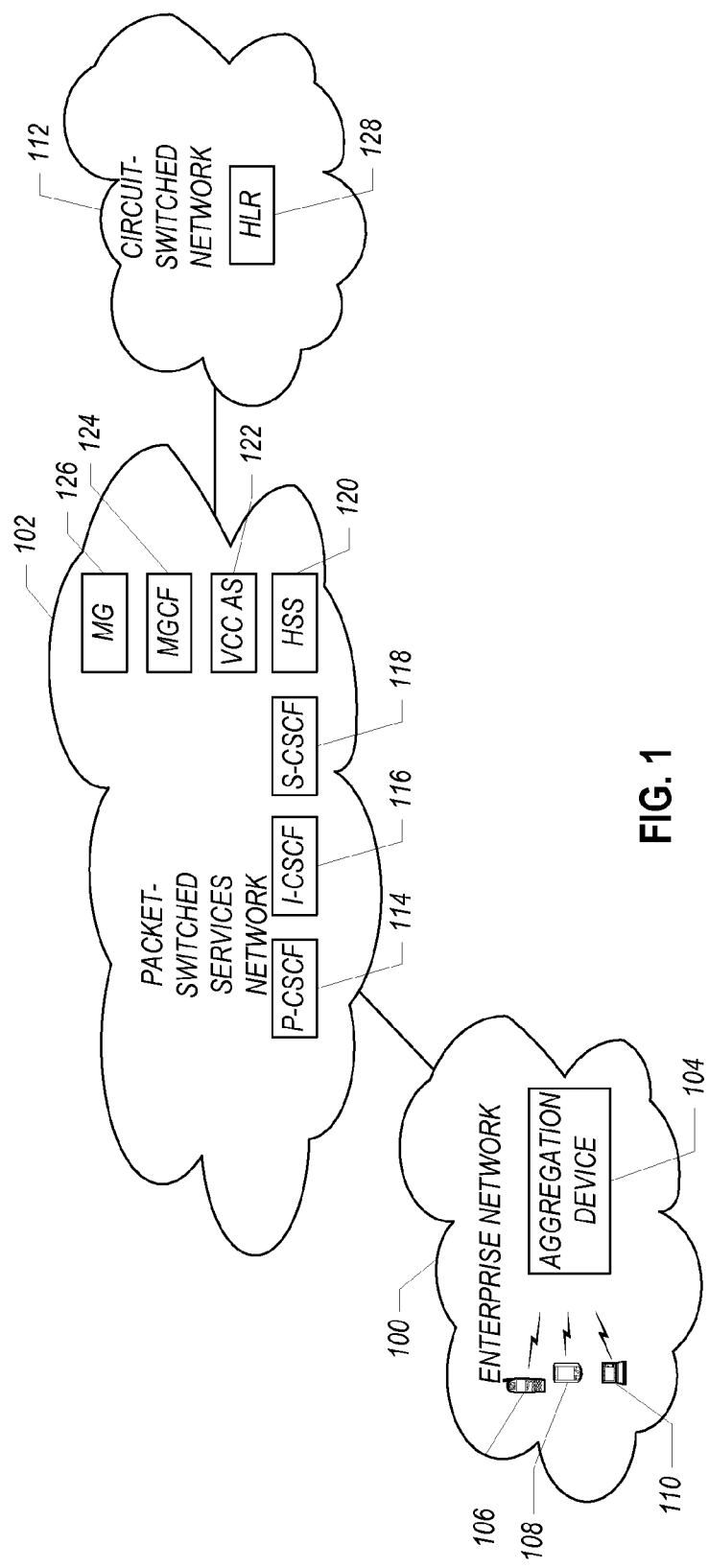
FIG. 1 is a block diagram of a communications network that incorporates an embodiment of the invention.

FIG. 1 illustrates an example communications network that includes an enterprise network 100 and a packet-switched services network 102. The enterprise network 100 has an aggregation device 104 (or multiple aggregation devices) that is connectable to various subscriber devices, such as a mobile station 106, a personal digital assistant 108, and a portable computer 110.

One example of packet-switched services network 102 is the Internet Protocol (IP) multimedia subsystem (IMS) network that includes various control functions for provision of IP multimedia services, including audio, video, text, chat, or any combination of the foregoing. IMS is defined by the Third Generation Partnership Project (3GPP). Alternatively, the packet-switched services network 102 can be a multimedia domain (MMD) network defined by 3GPP2, or a Next Generation Network (NGN) for use in the wireline context.

FIG. 1 also shows a circuit-switched network 112. An example of the circuit-switched network 112 is a 1xRTT wireless access network according to CDMA 2000 (Code Division Multiple Access 2000) as defined by 3GPP2. Other types of circuit-switched networks can be employed in other implementations.

One of the services provided by the packet-switched services network 102 is to allow a subscriber device in the enterprise network 100 to establish a communication session with an endpoint of the circuit-switched network 112. Alternatively, an enterprise network subscriber device can communicate with an endpoint in a packet-switched network (e.g., Internet, packet-switched wireless access network, etc.) using the packet-switched services network 102.

In the ensuing discussion, reference is made to "IMS network 102." It is contemplated that in alternative embodiments, the same or similar techniques can be applied to other types of packet-switched services networks.

The IMS network 102 includes IMS core nodes to provide various packet-switched services supported by the IMS network. For example, the IMS core nodes can be nodes used for establishing Session Initiation Protocol (SIP) communications sessions. SIP is a protocol used for establishing IP multimedia sessions. SIP is described in RFC (Request for Comments) 3261, entitled "SIP: Session Initiation Protocol," dated June 2002.

The IMS core nodes include a proxy call session control function (P-CSCF) 114, which is the first SIP aware control contact point for a network entity desiring to access the IMS network 102. The P-CSCF 114 in turn communicates SIP signaling with an interrogating CSCF (I-CSCF) 116 or serving CSCF (S-CSCF) 118 in the IMS network 102. An I-CSCF is the contact point within a service operator's network for connections destined to destinations in the service operator's network. Example tasks performed by the I-CSCF include handling initial registration by interrogating a home subscriber server (HSS) 120, routing a call control message received from another network towards an S-CSCF 118, and other tasks. The S-CSCF 118 handles session control within the IMS network 102 on behalf of network entities.

The HSS 120 stores authentication credentials and other user profile information for subscribers of the packet-switched services network 102. Another node within the packet-switched services network 102 is a voice call continuity application server (VCC) AS 122, a media gateway control function (MGCF) 124, and a media gateway (MG) 126. It is noted that the IMS network 102 can also include other nodes.

The circuit-switched network 112 includes a home location register (HLR) 128, which is a central database of the circuit-switched network 112 for storing credentials of each subscriber that is authorized to use the circuit-switched network 112. The circuit-switched network 112 also includes other nodes, such as mobile switching centers (MSCs), base station controls (BSCs), and base stations (not shown) to allow for circuit-switched access by subscribers.

In accordance with some embodiments, the IMS network 102 is able to create a dynamically generated globally unique identifier on behalf of a subscriber device attached to the enterprise network 100. The globally unique identifier can be a Globally Routable User Agent Uniform Resource Identifier (GRUU), in a format described in J. Rosenberg, Internet-Draft, entitled "Obtaining and Using Globally Routable User Agent (UA) URIs GRUU) in the Session Initiation Protocol (SIP)," draft-ietf-sip-gruu-15, dated Oct. 11, 2007. In other embodiments, other types of globally unique identifiers can be used for identifying subscriber devices within an enterprise network that desire to access an external packet-switched services network, such as the IMS network 102.

The GRUU is a combination of a SIP address of record (AOR) of the aggregation device 104 and identification information created by the aggregation device 104 on behalf of the subscriber device. In one embodiment, the identification information of the subscriber device created by the aggregation device 104 is a SIP.INSTANCE parameter, as described in C. Jennings et al., Internet-Draft, "Managing Client Initiated Connections in the Session Initiation Protocol (SIP)," draft-ietf-sip-outbound-16, dated Oct. 29, 2008.

Figure 2:
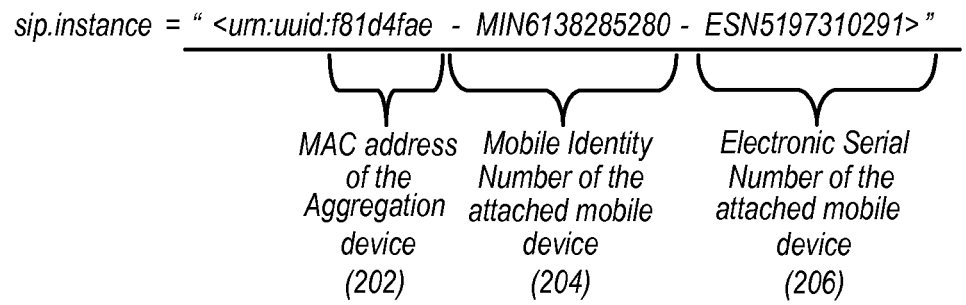
FIG. 2 illustrates a SIP.INSTANCE parameter, used according to an embodiment.

An example SIP.INSTANCE parameter that can be generated by the aggregation device 104 on behalf of a mobile device is depicted in FIG. 2. The SIP.INSTANCE parameter is a concatenation of a MAC (media access control) address (202) of the aggregation device 104, a mobile identity number (MIN) (204) of the attached mobile subscriber device, and an electronic serial number (206) of the attached mobile subscriber device. The concatenation of the MAC address 202 of the aggregation device, the MIN 204 of the mobile subscriber device, and the ESN 206 of the mobile subscriber device make up the identification information that is provided in the form of the SIP.INSTANCE parameter in FIG. 2, in one example embodiment.

The identification information in the SIP.INSTANCE parameter is then combined with the address of record of the aggregation device 104 to form the GRUU. The address of record for the aggregation device 104 is provided when the aggregation device 104 registers its preconfigured SIP address of record into the IMS network 102 when the aggregation device initially powers up. During registration of the aggregation device 104, the aggregation device 104 provides its contact information that contains the IP address of the aggregation device and the port of the aggregation device to use for signaling. This information allows the IMS network 102 to communicate with the aggregation device 104.

For each mobile subscriber device that the aggregation device 104 hosts, the aggregation device 104 will additionally register an additional contact into the IMS network 102. The additional contact contains the identification information in the form of a SIP.INSTANCE parameter explained above. Note that the identification information uniquely identifies the mobile device.

Figure 3:
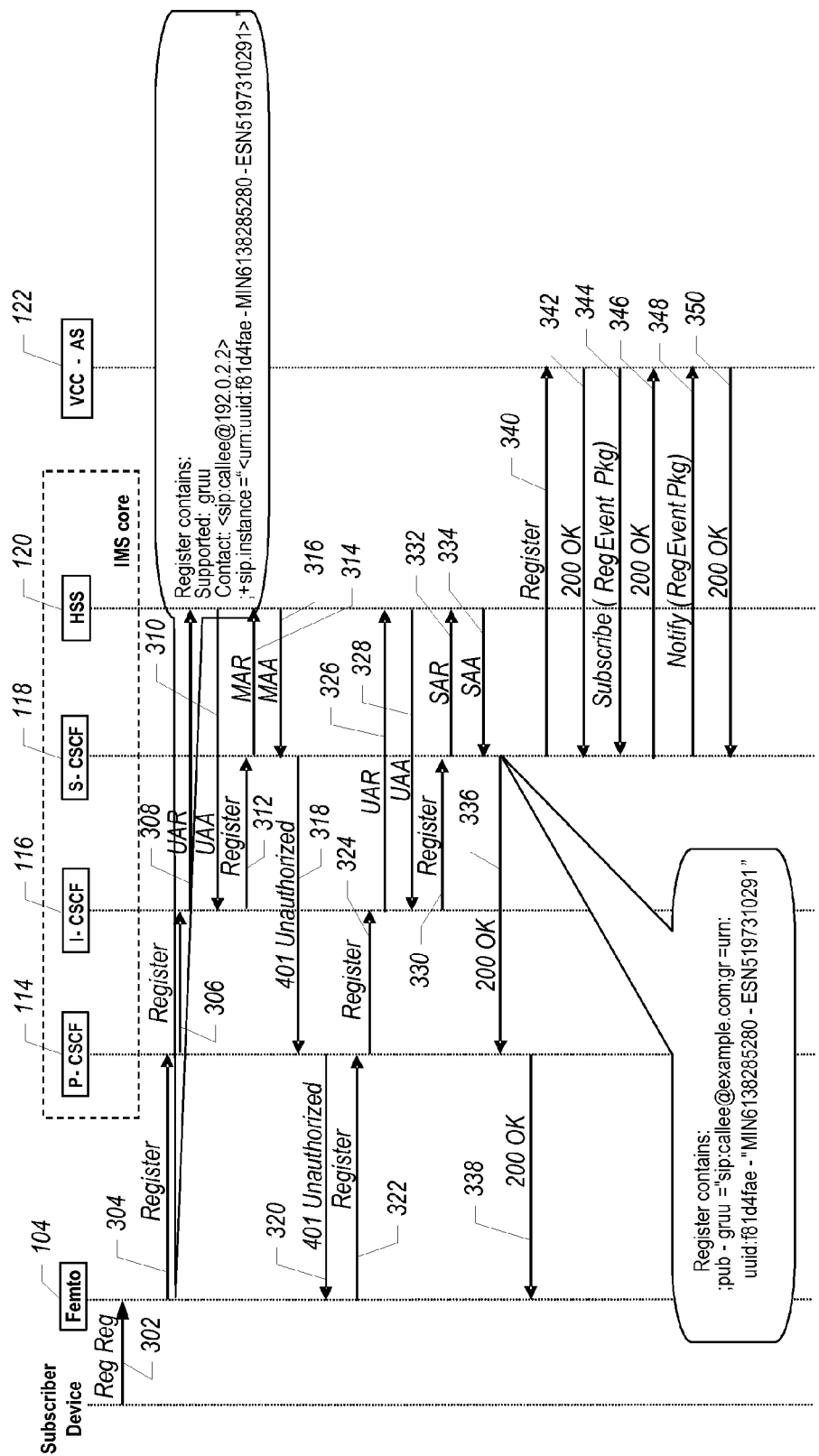
FIG. 3 is a message flow diagram for registering a subscriber device, according to an embodiment.

FIG. 3 depicts a registration procedure performed according to an embodiment in which a GRUU is dynamically created for an enterprise network subscriber device (e.g., subscriber device 106, 108, or 110 in FIG. 1), in accordance with an embodiment. When the subscriber device first powers up or enters the enterprise network 100, the subscriber device sends a registration request (at 302) to the aggregation device 104, which in FIG. 3 is depicted as a femtocell base station 104. In response to the registration request from the subscriber device, the femtocell base station 104 sends an SIP Register message (at 304) to the IMS network 102. More specifically, the SIP Register message sent at 304 is directed to the P-CSCF 114 in the IMS network 102.

In accordance with some embodiments, the Register message sent at 304 contains an indication that GRUU is supported, by setting the Supported field of the Register message to a value indicating support of GRUU. Moreover, the Register message contains a Contact field that has the following value: <sip:callee@192.0.2.2>; +SIP.INSTANCE, where SIP.INSTANCE is the parameter depicted in FIG. 2, in accordance with one example. The value <sip:callee@192.0.2.2> is the contact information of the femtocell base station 104. In addition, the Register message sent at 304 also contains unique identification information of the subscriber device that is registering with the femtocell base station 104, in the form of the SIP.INSTANCE parameter.

The P-CSCF 114 forwards (at 306) the Register message to the I-CSCF 116. Upon receipt of the Register message (sent at 306), the I-CSCF 116 performs an exchange with the HSS 120 to identify the S-CSCF that is to be used for performing registration. This is accomplished by the I-CSCF 116 sending a UAR (User Authorization Request) message (at 308) to the HSS 120, which responds with a UAA (User Authorization Answer) message (at 310), where the UAA message identifies the S-CSCF 118. The UAR/UAA messages are described in 3GPP 29.228. In response, the I-CSCF 116 forwards (at 312) the Register message to the S-CSCF identified in the UAA message.

Next, the S-CSCF sends (at 314) an MAR (Multimedia Authentication Request) message to the HSS 120 to ask for authorization data and to check for access permission of the femtocell base station (aggregation device) that initiated the registration flow. The HSS 120 responds (at 316) to the MAR message with an MAA (Multimedia Authentication Answer) message that includes an authentication vector used by the S-CSCF 118 to form an authentication challenge. The MAR/MAA messages are described in 3GPP 29.228.

Upon receipt of the MAA message, the S-CSCF 118 sends (at 318) a SIP 401 Unauthorized message to the P-CSCF 114. The 401 Unauthorized message is a SIP message that indicates that user authentication is required and contains the authentication challenge generated by the S-CSCF. The P-CSCF 114 forwards (at 320) the 401 Unauthorized message to the femtocell base station 104.

In response to the 401 Unauthorized message including the authentication challenge, the femtocell base station 104 again sends (at 322) a Register message to the P-CSCF 114. The Register message sent at 322 contains the femtocell base station's response to the challenge.

The P-CSCF 114 forwards (at 324) the Register message to the I-CSCF 116. The I-CSCF 116 again accesses the HSS 120 using the UAR message (326) to identify the S-CSCF 118 that the I-CSCF 116 should contact. The identification of the S-CSCF is provided back in the UAA message (at 328). In response, the I-CSCF 116 sends (at 330) a Register message to the S-CSCF 118. Upon receipt of the Register message at 330, the S-CSCF 118 sends a Server Assignment Request (SAR) message (at 332) to the HSS 120. The HSS 120 responds with an SAA message (at 334). The SAR/SAA messages are described in 3GPP 29.228.

At this point, the S-CSCF 118 is able to create the GRUU on behalf of the mobile subscriber device that is registering through the femtocell base station 104. The GRUU created is a public GRUU, where the public GRUU is a combination of the address of record of the femtocell base station (e.g., sip:callee@example.com) and the identification information contained in the SIP.INSTANCE parameter depicted in FIG. 2, in one example. The public GRUU generated by the S-CSCF 118 is sent (at 336) by the S-CSCF 118 to the P-CSCF 114 in a 200 OK message, which is forwarded (at 338) to the femtocell base station 104.

The femtocell base station 104 can use the GRUU to direct an incoming call to an enterprise network subscriber device. During call termination that specifies an enterprise network subscriber device as a destination, a calling gateway can insert the public GRUU into the Request-URI of the Invite message prior to sending the Invite message to the S-CSCF 118. The S-CSCF 118 will then insert the SIP.INSTANCE parameter into the Request URI prior to sending the Invite message to the P-CSCF 114 and subsequently to the femtocell base station 104. The femtocell base station 104 then uses the SIP.INSTANCE parameter in the Invite message to identify the correct subscriber device to alert.

The dynamically created GRUU is also sent to the VCC AS 122 in the IMS network 102 so that the VCC AS can identify the newly registered enterprise network subscriber device. Later, the VCC AS 122 can be contacted by a node attempting to establish a session with the subscriber device. As further depicted in FIG. 3, the S-CSCF 118 sends (at 340) a third party Register message to the VCC AS 122. The VCC AS 122 acknowledges with a 200 OK message (at 342). Also, the VCC AS 122 sends an SIP Subscribe message (at 346) to the S-CSCF 118, where the Subscribe message contains a registration event package to indicate that the VCC AS 122 is interested in obtaining the GRUU of the subscriber device that is the subject of the third party registration. The S-CSCF 118 responds to the Subscribe message with a 200 OK message (at 346).

Next, in response to the Subscribe message, the S-CSCF 118 sends (at 348) a Notify message to the VCC AS, where the Notify message contains a registration event package that contains the newly created GRUU of the enterprise network subscriber device (in addition to the previously created GRUUs for other active subscriber devices). The newly created GRUU is added to a database maintained by the VCC AS 122. Finally, the VCC AS 122 acknowledges the Notify message with a 200 OK message (sent at 350).

Figure 4:
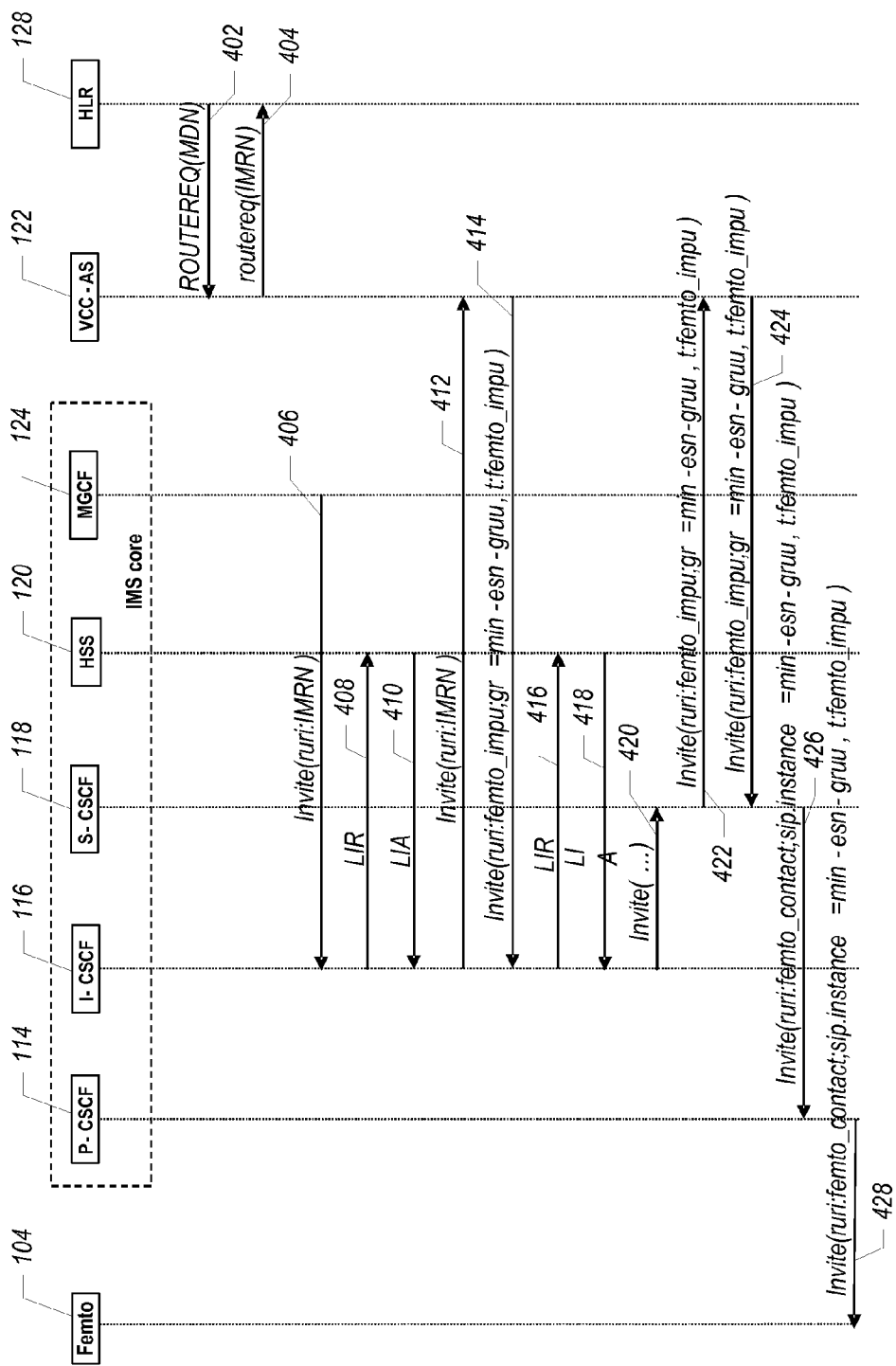
FIG. 4 is a message flow diagram of processing a session request using a globally unique identifier generated as part of the registration procedure of FIG. 3, in accordance with an embodiment.

FIG. 4 shows an incoming session request directed to the subscriber device in the enterprise network that is behind the femtocell base station 104. It is assumed that the incoming session request comes from a node in the circuit-switched network 112 (FIG. 1). In response to the call originated in the circuit-switched network 112, the HLR 128 in the circuit-switched network 112 is contacted to identify the destination information for the subscriber device in the enterprise network.

In response, the HLR 128 sends a ROUTEREQ message (at 402) to the VCC AS 122 that is in the IMS network 102. The ROUTEREQ message contains the mobile directory number (MDN), which identifies the destination subscriber device. In response, the VCC AS 122 sends (at 404) a routereq message that contains a corresponding IMRN (IMS Routing Number) back to the HLR 128. Note that the VCC AS 122 also caches the MDN that is provided over the ROUTEREQ message.

Once the IMRN is provided back to the HLR 128, the HLR 128 enables the circuit-switched network 112 to send a call origination message (not shown) to the MGCF 124 in the IMS network 102. In response to the call request received by the MGCF 124, the MGCF 124 sends (at 406) a SIP Invite message, which contains a request-URI that contains the IMRN.

The I-CSCF 116 then consults the HSS to identify the application server hosting the IMRN. To do this, the I-CSCF 116 sends (at 408) a LIR (Location Information Request) message to the HSS 120. The HSS 120 sends a response LIA (Location Information Answer) message (at 410) containing the address of the VCC AS 122 back to the I-CSCF 116. The I-CSCF 116 then forwards (at 412) the Invite message to the VCC AS 122.

The VCC AS 122 recognizes the incoming request and maps the MDN in the incoming Invite request to the identity of the femtocell base station 104 and to the GRUU corresponding to the destination subscriber device. The VCC AS 122 then modifies the Invite message to change the request-URI to refer to the address of record of the femtocell base station 104 as well as the identification information contained in a "gr" parameter in the Invite message.

The Invite message is then sent (at 414) to the I-CSCF 116. The I-CSCF 116 then forms an LIR/LIA exchange (416, 418) with the HSS 120 to identify the S-CSCF serving the femto public identity (femto_impu). In response, the I-CSCF 116 forwards (at 420) the modified Invite message to the S-CSCF, which in turn forwards (at 422) the modified Invite message to the VCC AS 122. The VCC AS 122 then sends (at 424) this Invite message back to the S-CSCF. The exchange at 422, 424 is part of the normal terminating procedure for a subscriber device that includes evaluation of terminating initial filter criteria. Within the subscriber's profile, the VCC AS 122 will be identified as requiring all Invite messages since it will need to anchor the signaling for potential future handoff requests. The S-CSCF routes the Invite message (at 422) to the VCC AS 122 due to the initial filter criteria, and the VCC AS 122 acts as a back-to-back user agent in routing the request back to the S-CSCF 118.

Next, the S-CSCF 118 modifies the request-URI in the Invite message to refer to the contact address of the femtocell base station, and sends this modified Invite message (at 426) to the P-CSCF 114, which in turn forwards the Invite message (at 428) to the femtocell base station. The Invite message sent at 426 and 428 includes the SIP.INSTANCE parameter. The femtocell base station uses the GRUU information contained in the Invite message to direct the incoming session request to the appropriate subscriber device.

The tasks above as performed by various nodes in the communications network, including the aggregation device 104, nodes in the IMS network 102, and nodes in the circuit-switched network 112.

Figure 5:
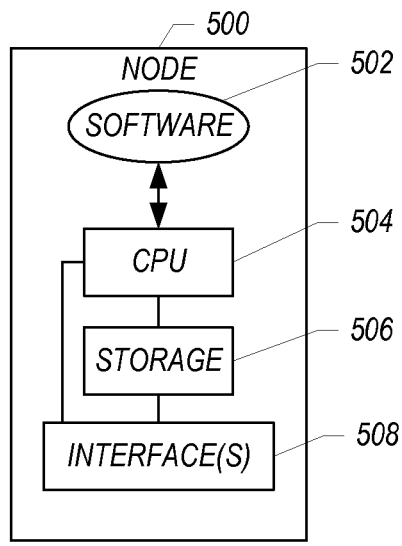
FIG. 5 is a block diagram of a node in which an embodiment of the invention can be incorporated.

FIG. 5 depicts a generic node 500 that is representative of any of the nodes discussed above. The node 500 includes software 502 that is executable on one or more central processing units (CPUs) 504, which is (are) connected to storage 506. The node 500 also includes one or more interfaces to allow the node 500 to communicate with other nodes, as explained above.

Instructions of the software 502 is loaded for execution on a processor, such as the CPU(s) 504. The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of registering a mobile device located in a first network with a packet-switched services network, comprising:
   receiving, from an aggregation device in the first network, a registration request containing a SIP address of record of the aggregation device and identification information created by the aggregation device on behalf of the mobile device, wherein the identification information comprises an identifier of the aggregation device and an identifier of the mobile device; and
   dynamically creating a Globally Routable User Agent Uniform Resource Identifier (GRUU) used to uniquely identify the mobile device in the packet-switched services network, the GRUU being a combination of the SIP address of record of the aggregation device and the identification information created by the aggregation device on behalf of the mobile device;
   wherein the mobile device is configured to access services of the packet-switched services network through the aggregation device.

2. The method of claim 1, wherein the identification information created by the aggregation device on behalf of the mobile device is a SIP.INSTANCE parameter.

3. The method of claim 2, wherein the SIP.INSTANCE parameter is a concatenation of a MAC address of the aggregation device, a mobile identity number of the mobile device, and an electronic serial number of the mobile device.

4. The method of claim 3, further comprising receiving the SIP address of record of the aggregation device and the MAC address of the aggregation device in response to the aggregation device performing a registration procedure with the packet-switched services network.

5. The method of claim 1, wherein creating the GRUU is part of a registration procedure performed in the packet-switched services network initiated by the registration request.

6. The method of claim 5, wherein performing the registration procedure in the services network comprises performing the registration procedure in a Session Initiation Protocol (IP) network.

7. The method of claim 1, wherein the identification information created by the aggregation device on behalf of the mobile device is previously unknown to the packet-switched services network.

8. The method of claim 1, further comprising sending the GRUU to an application server for storage at the application server to enable the application server to route calls directed to the mobile device.

9. The method of claim 8, wherein sending the GRUU to the application server comprises sending the GRUU to a voice call continuity (VCC) application server.

10. The method of claim 1, wherein the receiving and dynamically creating are performed by a node in the packet-switched services network.

11. A node configured to operate in a packet-switched services network, comprising:
an interface configured to receive a registration request sent by an aggregation device associated with an enterprise network to register a mobile device in the packet-switched services network, the registration request containing a SIP address of record of the aggregation device and identification information created by the aggregation device on behalf of the mobile device, wherein the identification information comprises an identifier of the aggregation device and an identifier of the mobile device; and
a processor configured to dynamically create a Globally Routable User Agent Uniform Resource Identifier (GRUU) used to uniquely identify the mobile device in the packet-switched services network, the GRUU being a combination of the SIP address of record of the aggregation device and the identification information created by the aggregation device on behalf of the mobile device.

12. The node of claim 11 wherein the identification information created by the aggregation device on behalf of the mobile device is a SIP.INSTANCE parameter.

13. The node of claim 12, wherein the SIP.INSTANCE parameter is a concatenation of a MAC address of the aggregation device, a mobile identity number of the mobile device, and an electronic serial number of the mobile device.

14. The node of claim 13, wherein the interface is configured to receive the SIP address of record of the aggregation device and the MAC address of the aggregation device in response to the aggregation device performing a registration procedure with the packet-switched services network.

15. The node of claim 11, wherein the processor dynamically creates the GRUU as part of a registration procedure performed in the packet-switched services network initiated by the registration request.

16. The node of claim 11, wherein the identification information created by the aggregation device on behalf of the mobile device is previously unknown to the packet-switched services network.

17. The node of claim 11, wherein the processor is also configured to send the GRUU to an application server for storage at the application server to enable the application server to route calls directed to the mobile device.

18. The node of claim 17, wherein the application server is a voice call continuity (VCC) application server.

19. A method of registering a mobile device located in a first network with a packet-switched services network, comprising:
receiving, from an aggregation device in the first network, a registration request containing a SIP address of record of the aggregation device and identification information created by the aggregation device on behalf of the mobile device, wherein the identification information comprises a SIP.INSTANCE parameter, wherein the SIP.INSTANCE parameter comprises a concatenation of a MAC address of the aggregation device, a mobile identity number of the mobile device, and an electronic serial number of the mobile device; and
dynamically creating a Globally Routable User Agent Uniform Resource Identifier (GRUU) used to uniquely identify the mobile device in the packet-switched services network, the GRUU being a combination of the SIP address of record of the aggregation device and the identification information created by the aggregation device on behalf of the mobile device.

20. The method of claim 19, further comprising receiving the SIP address of record of the aggregation device and the MAC address of the aggregation device in response to the aggregation device performing a registration procedure with the packet-switched services network.

21. A node configured to operate in a packet-switched services network, comprising:
an interface configured to receive a registration request sent by an aggregation device associated with an enterprise network to register a mobile device in the packet-switched services network, the registration request containing a SIP address of record of the aggregation device and identification information created by the aggregation device on behalf of the mobile device, wherein the identification information comprises a SIP.INSTANCE parameter, wherein the SIP.INSTANCE parameter comprises a concatenation of a MAC address of the aggregation device, a mobile identity number of the mobile device, and an electronic serial number of the mobile device; and
a processor configured to dynamically create a Globally Routable User Agent Uniform Resource Identifier (GRUU) used to uniquely identify the mobile device in the packet-switched services network, the GRUU being a combination of the SIP address of record of the aggregation device and the identification information created by the aggregation device on behalf of the mobile device.

22. The node of claim 21, wherein the interface is configured to receive the SIP address of record of the aggregation device and the MAC address of the aggregation device in response to the aggregation device performing a registration procedure with the packet-switched services network.

* * * * *

UNITED STATES PATENT AND TRADEMARK OFFICE
CERTIFICATE OF CORRECTION

| | | |
|---|---|---|
| PATENT NO. | : 8,811,988 B2 | Page 1 of 1 |
| APPLICATION NO. | : 13/485290 | |
| DATED | : August 19, 2014 | |
| INVENTOR(S) | : Anthony Robert Jones et al. | |

It is certified that error appears in the above-identified patent and that said Letters Patent is hereby corrected as shown below:

On the Title Page, Item (54) and in the Specification, Column 1, lines 1-9, Title:

Please delete, "Dynamically Creating A Globally Unique Identified Of A Subscriber Device Based On An Identified Of An Aggregation Device And Identification Information Of The Subscriber Device For Circuit-Switched And Packet-Switched Communication Systems" and substitute
-- Dynamically Creating A Globally Unique Identifier Of A Subscriber Device Based On An Identifier Of An Aggregation Device And Identification Information Of The Subscriber Device For Circuit-Switched And Packet-Switched Communication Systems --

Signed and Sealed this
Twenty-first Day of October, 2014

Michelle K. Lee
*Deputy Director of the United States Patent and Trademark Office*